United States Patent [19]

Pointner

[11] 4,065,839

[45] Jan. 3, 1978

[54] METHOD AND APPARATUS FOR THE PRODUCTION OF STACKED, ETCHED PATTERNED METAL FOILS FOR COMPONENT ELEMENTS

[75] Inventor: Martin Pointner, Kirchseeon, Germany

[73] Assignee: Siemens Aktiengesellschaft, Berlin & Munich, Germany

[21] Appl. No.: 705,692

[22] Filed: July 15, 1976

[30] Foreign Application Priority Data

July 25, 1975 Germany ............................ 2533369

[51] Int. Cl.[2] ....................... B21D 33/00; B65G 57/04

[52] U.S. Cl. ....................................... 29/17 R; 29/18; 29/19; 83/100; 214/1 BT; 214/6 FS; 271/194; 271/217

[58] Field of Search ................ 29/17 R, 17 A, 19, 18; 83/100, 99, 86, 73, 103; 214/1 BT, 8.5 D, 6 H, 6 FS, 650 SG, DIG. 1, 6 DS; 271/194, 195, 267, 217, 219

[56] References Cited

U.S. PATENT DOCUMENTS

| | | | |
|---|---|---|---|
| 2,813,637 | 11/1957 | Perry et al. | 214/6 DS |
| 2,941,341 | 6/1960 | Clinton | 83/100 X |
| 3,014,601 | 12/1961 | Swanson | 214/6 H X |
| 3,129,825 | 4/1964 | Lamb | 214/6 H |
| 3,415,388 | 12/1968 | Hörnlein et al. | 214/8.5 D |
| 3,456,653 | 7/1969 | Sandqvist | 83/100 X |
| 3,542,412 | 11/1970 | Koch et al. | 214/1 BT X |
| 3,589,224 | 6/1971 | Frantzen | 83/100 |
| 3,717,538 | 2/1973 | Hartung | 83/86 X |
| 3,939,740 | 2/1976 | Johnson | 83/100 X |
| 3,973,795 | 8/1976 | Goransson | 214/1 BT X |

*Primary Examiner*—Travis S. McGehee
*Attorney, Agent, or Firm*—Hill, Gross, Simpson, Van Santen, Steadman, Chiara & Simpson

[57] ABSTRACT

A method and apparatus for the production of a stack of etched, patterned metal foils for component elements, such as fluid plates and nozzle plates, is disclosed. Individual patterned foils are cut free from a mat having a group of patterned foils and also edge foils. The patterned foils are examined and unwanted foils together with the edge foils are discarded. The approved foils are individually stacked at stacking positions in a stacking station. A number of foil stacks corresponds to the number of individual patterned foils in the mat with the patterned foils being placed on the foil stacks in correspondence with their arrangement in the mat. Additional patterned foils from additional mats are stacked onto the individual foil stacks until a counter for each of the stacks determines that a predetermined number of stacked foils has occurred. The stack is removed and a new stack is begun until the counter again arrives at the predetermined number of foils for a given stack.

9 Claims, 3 Drawing Figures

METHOD AND APPARATUS FOR THE PRODUCTION OF STACKED, ETCHED PATTERNED METAL FOILS FOR COMPONENT ELEMENTS

BACKGROUND OF THE INVENTION

1. Field of the Invention

This invention relates to a method and apparatus for the production of stacked, etched metal foils useful as component elements such as in fluid plates and nozzle plates.

2. Description of the Prior Art

It is common to construct component elements having a complicated shape or configuration, such as fluid plates and nozzle plates, by the use of stacked, etched patterned foils. First, a plurality of mats containing a group of patterned foils are produced by means of etching. After examination, certain of the foils are marked as scrap at which point the desired patterned foils are cut free from the mat. The foils which are determined to be acceptable are stacked to form a component element by use of a stacking device. All foils are provided with alignment holes or cuts. These holes permit precise registration of the patterned foils in stacks on the stacker since the stacker carries alignment pins which engage the alignment holes. The group of foils contained in the mat consist of similar patterned foils. It is unavoidable, however, for some of the foils to deviate from the ideal pattern, such deviations lying within a range of $10^{-3}$ mm. Errors of this type can result during exposure or may already be present in a film negative. Therefore, the individual patterned foils of different mats most nearly correspond to one another according to their respective positions in the mats.

The foil thickness of the patterned foils usually lies within the range of 2 to $5 \times 10^{-2}$ mm. Copper or copper-beryllium is used as the foil material. In the case of thicker patterned foils from $5 \times 10^{-2}$ mm. and greater, steel or similar materials are also employed. Very thin foils have the property of easily curling. When the foils are rolled, different stresses arise within the material which creates the possibility of curling. These aforementioned disadvantages result in difficult handling of the patterned foils while they are stacked for use as a component element.

SUMMARY OF THE INVENTION

It is an object of this invention to improve and facilitate the method for the production of component elements fashioned from etched patterned foils.

It is another object of this invention to provide an apparatus to suitably carry out the method of this invention.

With the invention, patterned foils are initially cut free from a mat. Edge foils, as well as undesirable foils, are removed. Patterned foils found to be acceptable are left in position for the time being. Foil stacks are then developed which correspond to the number of patterned foils contained in the mat. To create these foil stacks, the individual patterned foils are placed on stacks which correspond to their position in the mat. Thereafter, patterned foils from another mat are stacked and during each of the stacking operations, the foils placed on top of the individual stacks are each counted. When a predetermined number of foils occurs in one of the stacks, the stack is removed and a new stack begins. This same procedure occurs for the other foil stacks.

By use of the inventive method disclosed herein, component elements are obtained which are as similar to one another as possible and wherein flanks of the etched foils have a comparative low roughness factor.

The etched mat is originally located on the suction plate. Defective foils are marked. After the foils have been cut free from the mat, edge foils are blown off. The suction plate with the mat thereon is fed to a transfer station. The patterned foils found to be acceptable are fed to transfer means and the patterned foils marked as unacceptable are blown off the suction plate. By use of transfer means, the acceptable patterned foils are mechanically fed to a stacking station having stacking positions corresponding to positions of the foils in the mat. The stacking of foils occurs simultaneously at all stacking positions of the stacking station. Each stacking operation is counted at each position of the stacking station. If no foil is deposited at one of the stacking positions, because, for example, the foil assigned to that stacking position was found unacceptable, the counter assigned to that position is not advanced. Upon reaching a predetermined number of foils at a position within the stacking station, the stack is removed from that position and the counter is again set to a starting value. A new stack thereupon develops in the recently vacated position of the stacking station. The apparatus for stacking the foils consists of a suction plate holding the patterned foil mat and which exhibits two independent air channels therein. The suction plate with associated mat is placed in a transfer station wherein individual transfer elements, preferably provided as suction traverses, pick up the individual patterned foils and transfer them along a guide and placement mechanism to the stacking station. Within the stacking station, individual stacking positions are provided having stacking plates and associated counters. An elevating mechanism moves the stacking plates into position.

The suction plate holding the patterned foil mat is pushed into the transfer station and held there by means of a detent arm. The suction traverses are moved above the patterned foils and, for a transfer, the suction plate is raised until it is firmly beneath the suction surface of the suction traverses. The patterned foils are then blasted off the suction plate by applying compressed air while a vacuum is simultaneously applied to the suction traverses. The suction traverses may also have alignment pins which engage in alignment holes of the patterned foils during transfer. After the foils have been transferred to the suction traverses, the traverses are mechanically moved to respective stacking positions. The depositing of the patterned foils on the corresponding stacking plates of the individual stacking positions occurs by means of simultaneous lifting of the stacking plates together with application of compressed air to the suction traverses. During transfer, alignment pins mounted on the stacking plates engage in etched alignment holes of the patterned foils. The stacking plates are then commonly raised and pressed against the suction traverses so that the foils lie compactly stacked on the stacking plates. A counter is connected to each stacking stroke. If no foil is deposited on the stacking plate, the the counter is not activated when the stacking stroke takes place. After transfer, the suction plate is removed from the apparatus and prepared for receiving the next stack. It is possible to initiate the stacking operation automatically by use of a terminal switch arranged at the transfer station. If a patterned foil marked unacceptable is located in the group of foils inserted in the transfer station, the suction traverse opposite the undesirable foil automatically switches over to an air blast mode for the purpose of sorting out the foils so that a transfer of an undesirable foil to the stacking position does not occur. Since the individual stacks grow at various speeds due to the rejection of undesirable foils, and also since stacks are removed at various times, the application of cover foils on the stacks after the removal of a stacking plate takes place in a special cover foil application station such that the latter is present only once, that is, it is common to all stacks.

DESCRIPTION OF THE PREFERRED EMBODIMENTS

Figure 1:
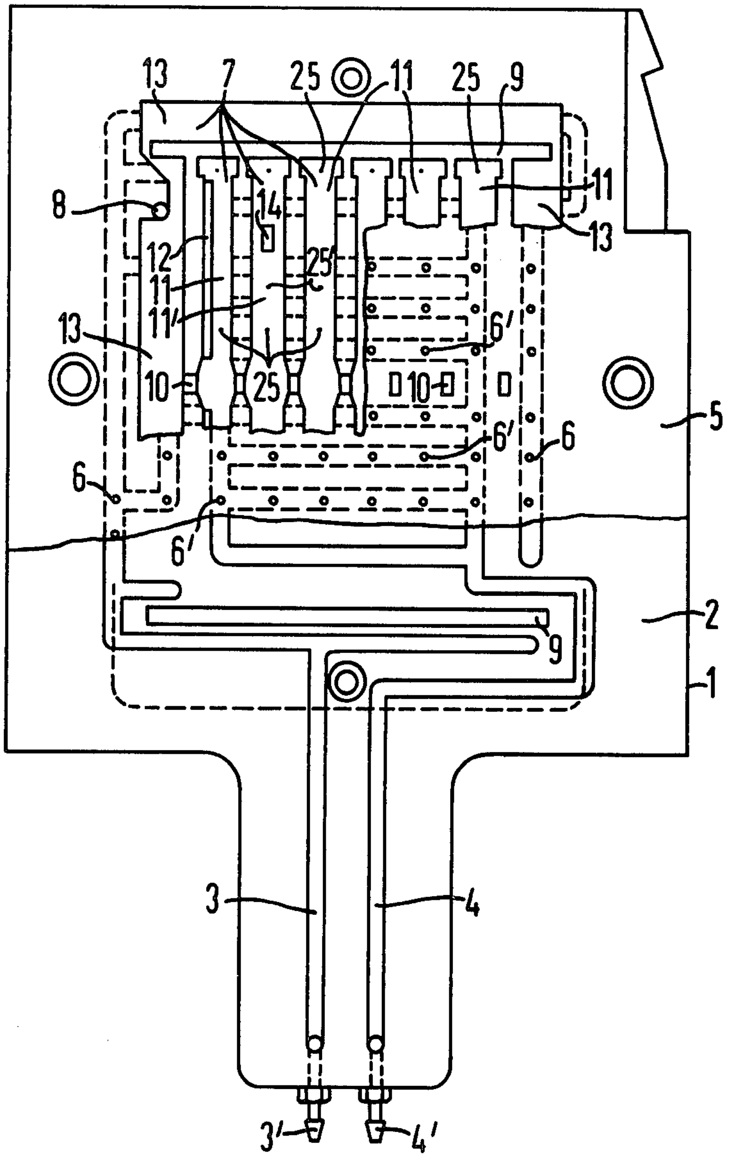
FIG. 1 is a plan view of the suction plate and patterned foil mat of this invention.

In FIG. 1, a suction plate 1 is shown together with a fragmentary section of a patterned foil mat 7. The suction plate consists of a plate-shaped member 2 having a surface in which air channels 3 and 4 are arranged. These switchable air channels are connected to a suction pump or to an air blower via suction connecting nozzles 3', 4', respectively. The plate surface is covered by a cover plate 5 only partially illustrated in FIG. 1. A plurality of holes 6, 6' are introduced into this cover plate. The partially illustrated mat 7 is located on the cover plate 5 and is aligned by use of adjusting pins 8. If a vacuum is connected to the nozzles 3', 4', the mat is then pressed tightly against the cover plate. In this state, the suction plate 1 is conveyed to a cutting apparatus together with the mat 7. In the region of slots 9 and 10 the foils 11 are cut free from the mat in one cutting stroke. The foils carry a nozzle arrangement in the region of edge 12 as illustrated in broken lines in the case of only one foil arrangement. All foils 11 should be the same. However, for reasons of a technical nature, small deviations in the dimensions of the individual foils cannot be avoided during production. The six foils 11 illustrated here form a group of foils within the mat 7. After the process of cutting the foils free has been completed, the suction plate 1 is removed from the cutting apparatus. By aerating the connecting nozzle 3', the edge foil 13 of the mat is blown off from the cover plate 5 whereas the group of foils 11 remain on the plate. In the step carried out prior to this, the mat is examined and undesirable scrap foils are marked. The individual foils are now subjected to analysis. Wherever a scrap foil such as 11' is encountered, (as marked at 14) the position of that foil is stored within the operational sequence control unit 51 shown in FIG. 3, by pressing a key assigned to the position of the foil to be discarded. The suction plate is now conveyed to a stacking apparatus.

Figure 2:
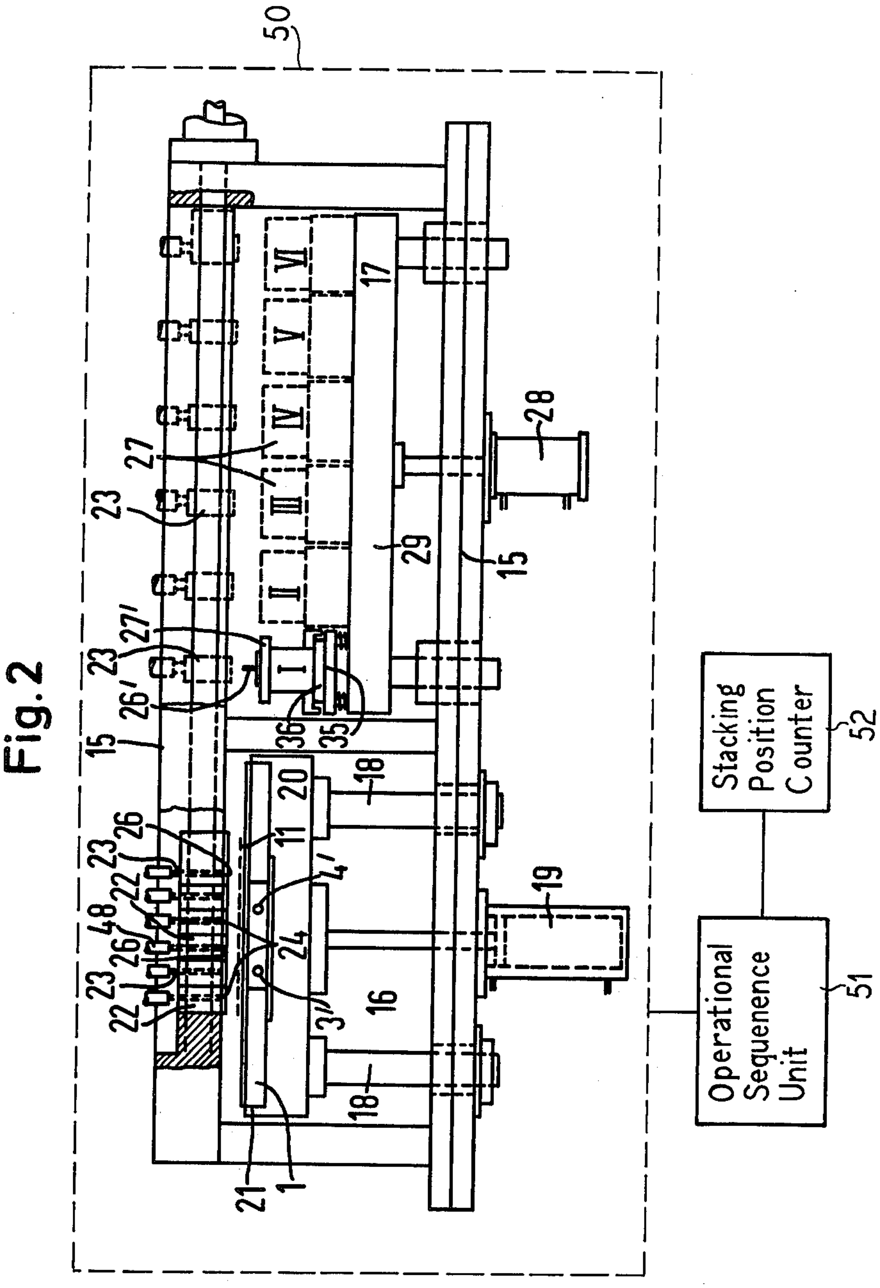
FIG. 2 is a side view of the guidance and placement apparatus for transferring patterned foils to stacking stations.
Figure 3:
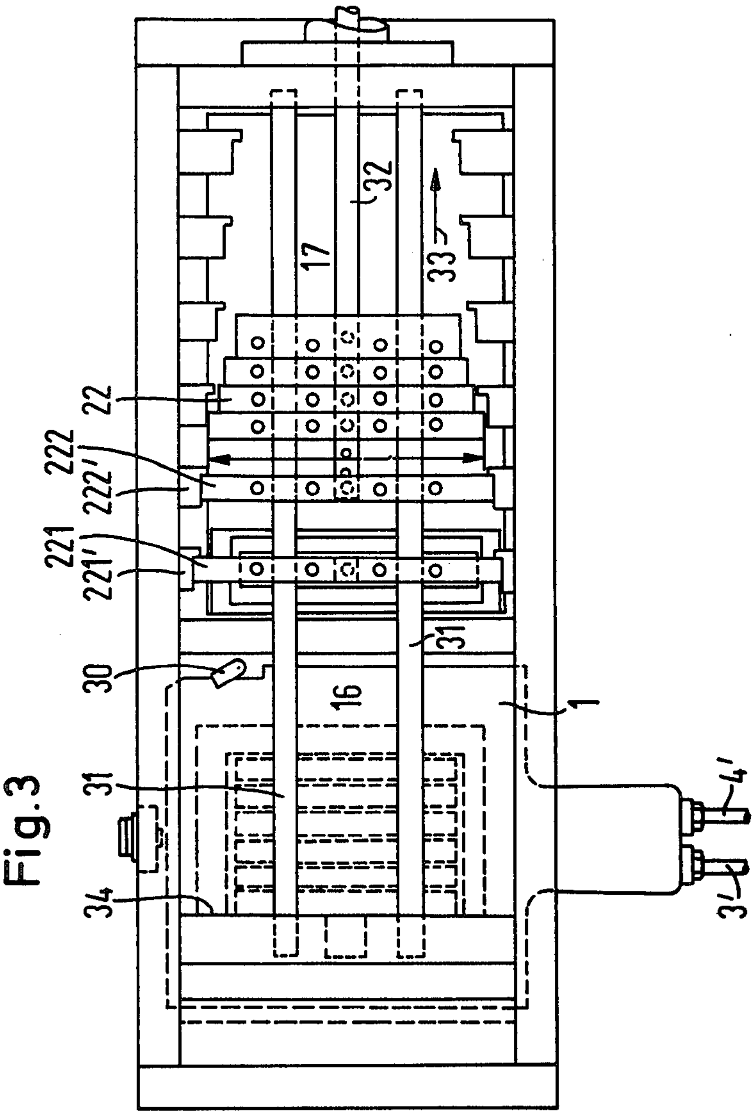
FIG. 3 is a top view of the apparatus of FIG. 2.

A stacking apparatus 15 of this type is schematically illustrated in FIGS. 2 and 3. FIG. 2 shows a stacking apparatus 50 in a lateral view whereas FIG. 3 shows the same apparatus from above. The stacking apparatus is divided into two sections, the so-called transfer station 16 and a stacking station 17. The transfer station consists of a lifting table 20 which is mounted in guides 18 and is capable of being raised and lowered by means of a pneumatic cylinder 19. This table has lateral guides 21 for receiving and pushing in the suction plate 1. In the illustrated raised position of the lifting table the foils 11 are located directly beneath suction traverses 22. The arrangement is such that in the fixed position of the suction plate, each suction traverse is located precisely above one of the individual pattern foils. If connecting nozzle 4' of the suction plate 1 is now aerated, and if simultaneously a vacuum is applied to the suction nozzle 23 of the suction traverse 22, the individual foils will adhere to these holding surfaces 24 of the suction traverses 22. Additional alignment holes 25 are etched into the foils for the purpose of aligning in cooperation with the alignment pins 26 on the suction traverses. During suctioning of the foils, the alignment pins 26 engage in the assigned holes of the pattern foils. After transfer of the foils to the suction traverses, suction plate 1 is removed. The undesirable foils whose positions were stored in the operation sequence control unit are now blown off and freely dropped to the bottom of the apparatus. Subsequently, the suction traverses are moved into their stacking positions I through VI. As illustrated in dashed lines, in this state each of the suction nozzles 23 of the suction traverses 22 is located opposite a stacking position corresponding to it.

The stacking station likewise consists of a stacking table 29 which is adjustable in height by means of a pneumatic lifting device 28 and which carries a number of stacking plates 27 corresponsing to the number of foils in the mat. For a better overview, only stacking plate 27' is exclusively illustrated. The other stacking plates are indicated as broken lines. The transfer and stacking of the foils on the stacking plates proceeds in a corresponding reverse sequence as compared with the transfer of foils from the suction plate to the suction traverses. The stacking plate also has positioning pins 26'. The spacing of these pins, however, differs from the spacing of the positioning pins 26 in the suction traverses. The individual foils have several alignment holes 25 and 25' (see FIG. 1). The alignment holes 25 are associated with the alignment pins 26 and the traverses 22 whereas the alignment holes 25' correspond to the alignment pins 26' and the stacking plates 27. By use of such structure, all the alignment holes in the very thin foil are used only once. In order to transfer the foil to the stacking plates of the individual stacking positions, the lifting table 29 is first driven until it is located tightly beneath the suction traverses. The nozzles 23 are then weakly aerated with compressed air so that the foils are ejected from the suction traverses. The positioning pins 26' then engage the alignment holes 25'. Recesses are located in the suction traverses in which the alignment pins 26' can enter. For the purpose of stacking, the lifting plate 29 is now raised further so that the foils stacked on the individual stacking plates can be compressed into one pack. Thereafter, the return stroke of plate 29 occurs as well as the resetting of the suction traverses to the illustrated positions in transverse station 16.

As shown in FIG. 3, the suction plate 1 is fixed in position by a detent 30 to the suction traverses in the transfer position of the foils. This detent is cushioned and may have a handle which is not illustrated here for releasing the suction plate 1. The suction traverses are conveyed by round bars 31 and by use of a pull rod 32 which enables the traverses to be positioned from a transfer station 16 to the respective stacking stations I through VI and back again. In the present example, this placement mechanism consists of a spring loaded detent provided on each suction traverse. If the pull rod is drawn in the direction of arrow 33 as shown in FIG. 3, the suction traverse 221 first abuts against a stop 221'. As a result, the spring loaded detent becomes disengaged from a bore stop hole provided in the pull rod and the latter then remains in its transfer station. In the course of additional movement of pull rod 32 in the direction of arrow 33, the suction traverse 222 strikes an additional stop 222'. Here also the spring loaded detent is then released whereupon the operation is repeated until all suction traverses have been transported into their assigned stacking positions. As is apparent, the length "*l*" of the suction traverses are sequentially graduated. Correspondingly, the stops are also sequentially graduated such that upon activation of the pull rod 32 in the direction of arrow 33, the suction traverses one after another strike the stops to which they are assigned. If the suction traverses are again brought to their transfer station 16, pull rod 32 is activated in a direction opposite to arrow 33. The individual suction traverses are released from the stops in reverse sequence and slide into a resting position 34. During the constant movement of the pull rod, all the suction traverses lie against one another so that they are in contact, whereby all detents fall into the assigned detent holes. Stacking plate 27 can be pushed into a spring carrier member 35. When the intended number of foils has been stacked in a position of the stacking station, stacking plate 27 is removed from guide 36 of support 35 by use of a handle not illustrated after which a new stacking plate is inserted. It is significant here that the number of foils which are on one stack in one of the stacking positions I through VI must be known. For this purpose, a counter 52 is assigned to each stacking plate which indicates the number of foils that still need to be stacked. The positions of the undesired foils stored earlier in the operational sequence control unit 51 cause the corresponding counter not to advance further.

The illustrated placement mechanism used to transfer the suction traverses from the transfer to the stacking position and back may also be embodied in a manner not illustrated here without departing from the framework of the invention.

Although various minor modifications may be suggested by those versed in the art, it should be understood that I wish to embody within the scope of the patent warranted hereon, all such embodiments as reasonably and properly come within the scope of my contribution of the art.

I claim as my invention:

1. A method for the production of stacks of pre-etched, patterned foils, each stack being provided to form a component comprising the steps of:

a. cutting individual patterned foils free from a mat comprising pre-etched patterned foils and also edge foils;
b. examining said patterned foils and discarding unwanted patterned foils and the edge foils;
c. stacking approved foils for a component by use of a stacking apparatus, said stacking comprising the step of
   i. placing the individual patterned foils by individually movable transfer elements on individually arranged foil stacks, the number of foil stacks corresponding to the number of individual patterned foils in the mat, the patterned foils being placed on the arranged foil stacks in correspondence with their arrangement in said mat; and
d. stacking additional patterned foils from additional mats onto the corresponding stacks and counting the foils placed on each of the stacks during each stacking operation until a predetermined number of foils occurs in a stack, removing that stack, beginning a new stack and continuing until a predetermined number of patterned foils occurs in another stack.

2. An apparatus for the production of a stack of etched, patterned metal foils for component elements, comprising:

a. a transportable suction plate for accommodating a mat comprising a group of pre-etched patterned metal foils, said plate having two independent air channels;
b. a transfer station into which said suction plate is insertable;
c. a stacking station having a group of stacking positions, a lifting mechanism supporting said stacking positions and a counter associated with each stacking position; and
d. a guide and placement means having transfer elements for transferring individual patterned metal foils from the suction plate at the transfer station to corresponding component stacking positions at the stacking station in correspondence with placement positions of the foils in the mat.

3. The apparatus of claim 2 in which the transfer elements are suction traverses which are shifted along guides, a stop means being provided for each stacking position of the stacking station for aligning individual foils with said corresponding stacking positions.

4. An apparatus for the production of a stack of etched patterned metal foils for component elements, comprising:

a. a suction plate for accommodating a mat comprising a group of patterned metal foils, said plate having two independent air channels;
b. a transfer station adapted to receive said suction plate;
c. a stacking station having a group of stacking positions, a lifting mechanism supporting said stacking positions and a counter associated with each stacking position;
d. a guide and placement means having transfer elements for transferring individual patterned metal foils from the suction plate at the transfer station to the stacking positions at the stacking station;
e. said transfer elements being provided as suction traverses which are shifted along guides, a stop being provided for each stacking position of the stacking station; and
f. said suction traverses having lengths which are graduated in a sequence, that the stops protrude in a graduated sequence, and that the combined lengths of the suction traverses with their corresponding stops are constant.

5. The apparatus of claim 3 in which the stops are arranged along a guide path of the suction traverses and stacking plates are arranged at the stacking positions on a stacking table, said suction traverses being movable to positions opposite the stacking plates.

6. The apparatus of claim 3 in which the suction traverses are movable opposite the suction plate in the transfer station.

7. An apparatus for the production of a stack of preformed patterned metal foils for component elements, comprising:

a. a transportable suction plate means for positioning a mat of preformed patterned metal foils, said plate means having air suction and expelling means;

b. a transfer station adapted for insertion of said suctin plate means;

c. a stacking station having stacking positions corresponding to each of the patterned metal foils in said mat, a counter being provided for each stacking position; and d. guide and placement means for transferring the individual patterned metal foils from the transfer station to its corresponding stacking position.

8. The apparatus of claim 7 in which said guide and placement means includes a suction traverse for each stacking position.

9. A method for the production of a stack of etched, patterned metal foils for component elements comprising the steps of:

a. holding a mat of patterned foils and edge foils in place by air suction;

b. cutting individual patterned foils free from a mat comprising said patterned foils and also edge foils and blowing away the edge foils;

c. examining said patterned foils engaging each patterned foil with an individual air suction transfer member and discarding unwanted patterned foils by releasing the suction of the appropriate transfer member;

d. stacking approved foils for a component element by use of a stacking apparatus, said stacking comprising the step of i. placing the individual patterned foils on individually arranged foil stacks with said individual air suction transfer members, the number of foil stacks corresponding to the number of individual patterned foils in the mat, the patterned foils being placed on the arranged foil stacks in correspondence with their arrangement in said mat; and d. stacking additional patterned foils from additional mats onto the corresponding stacks and counting the foils placed on each of the stacks during each stacking operation until a predetermined number of foils occurs in a stack, removing that stack, beginning a new stack and continuing until a predetermined number of patterned foils occurs in another stack.

* * * * *